United States Patent [19]

DeFoe

[11] 4,087,836
[45] May 2, 1978

[54] SIGNAL PROCESSING FOR AN IMAGING DEVICE

[75] Inventor: Douglas Nelson DeFoe, Winnetka, Ill.

[73] Assignee: Bell & Howell Company, Chicago, Ill.

[21] Appl. No.: 757,522

[22] Filed: Jan. 7, 1977

[51] Int. Cl.$^2$ .................. H04N 3/14; H04N 9/04
[52] U.S. Cl. .................................................. 358/44
[58] Field of Search ........................... 358/44, 41, 37

[56] References Cited

FOREIGN PATENT DOCUMENTS 2,504,617  4/1976  Germany .......................... 358/44

*Primary Examiner*—Robert L. Richardson
*Attorney, Agent, or Firm*—John H. Moore; Roger M. Fitz-Gerald

[57] ABSTRACT

A method and apparatus are described for generating an electrical signal representative of the blue component of light incident upon an imaging device. The imaging device has rows of horizontally spaced sets of light-sensitive picture elements, each such element generating an electrical output in response to one or more of the red, blue and green components of incident light. To generate a signal indicative of the average intensity of blue light incident upon a selected pair of picture elements in a selected set, the outputs of the selected pair of picture elements as well as the outputs of the other picture elements in the selected set are detected. The outputs of a pair of picture elements in an adjacent set are also detected. The detected outputs of all picture elements in the selected set are combined with the detected outputs of the pair of picture elements in the adjacent set such that the outputs of the selected pair of picture elements are included twice in the combined total and such that the outputs of picture elements responsive to incident blue light are added together and the outputs of picture elements responsive only to incident red and green light are subtracted therefrom. The total thus obtained is divided by the number of picture elements in a set. The resultant signal is proportional to the blue component of light incident upon the selected pair of picture elements.

20 Claims, 9 Drawing Figures

EQUATION (a) SAMPLE I $= -(G) + (W) + (-R) - (-B)$

EQUATION (b) SAMPLE II $= +(-R) - (-B) - (G) + (W)$

EQUATION (c) FOR −R−B   PAIR $= \left[\frac{I}{4} + \frac{II}{4}\right] \times \left[\underline{-R} + \frac{1}{2}(\underline{-B})\right]$ EQUATION (d) FOR GW   PAIR $= \left[\frac{I}{4} + \frac{II}{4}\right] \times \underline{W}$

SIGNAL PROCESSING FOR AN IMAGING DEVICE

BACKGROUND OF THE INVENTION

This invention is generally directed to the processing of video signals associated with video imaging devices. It is more particularly directed to a method and apparatus for generating electrical signals representative of the blue components of light images received by the imaging device of a color television camera.

In the past, it has been proposed that an imaging system for a color television camera include a solid state image pick-up device which vertically and horizontally divided into light-sensitive areas or picture elements. Typically, incident light causes the generation of free electrons within the picture elements, the number of electrons generated being proportional to the intensity of the incident light. The free electrons, in turn, are used to generate output signals representative of the intensity of incident light.

In order to generate signals representative of the color of the incident light, a filter may be interposed between the lens system of the camera and the solid state pickup device. Such a filter is normally divided into filter stripes corresponding in number to the vertical areas in the pick-up device, one filter stripe overlying each vertical area or set of vertical areas in the pick-up device. Further, each filter stripe is selected to pass light of predetermined wavelengths and to absorb or reflect light of differing wavelengths. For example, such a filter might have successive, repeating sets of vertical filter stripes denoted as white (W), minus red (−R), minus blue (−B) and green (G). White light (a combination of red, blue and green light) passes through the white filter stripe, blue and green light pass through the minus red filter stripe, green and red light pass through the minus blue filter stripe, and green light (corresponding to minus red and minus blue) passes through the green filter stripe. Thus, each vertical area on the pick-up device receives only the light of the color or colors transmitted by its corresponding filter stripe. Herein, the light-sensitive picture elements on the pick-up device are referred to by the color of light incident upon them, i.e., W, −R, −B, or G.

The pick-up device can be thought of as being divided into repeating, horizontally spaced sets of picture elements, each set having four elements, for example, a W, a −R, a −B and a G element. To generate a signal corresponding to the light incident upon one set of light-sensitive elements, the outputs of each element in the set is sampled and decoded to generate an electrical signal indicative of the average red, blue and green components of the light incident on the entire sampled set of elements.

To generate a complete raster, successive sets of elements are scanned and sampled to generate a composite electrical signal corresponding to the light reflected to the pick-up device from an object or scene.

One reason why it has been thought necessary to include four light-sensitive elements in each sampled set of elements is that blue light, typically of a lower luminous intensity than red or green light, requires a greater sampling area to generate a signal having a desirable signal-to-noise ratio. Signals corresponding to red and green light can be sampled by using only a selected two or one, respectively, of the light-sensitive elements in each sampled set. Accordingly, all light which is received by one set of elements is sampled and decoded to generate an electrical signal indicative of the average blue light incident on the sampled set, even though any one or more of the light-sensitive elements may receive no blue light. This aspect of prior filter systems leads to undesirable results.

For example, should a color transition or a change in the intensity of a color occur within the area corresponding to a sampled set of light-sensitive elements, the blue component of the decoded signal may be of an incorrect amplitude. A further undesirable aspect of such prior systems is that, although blue light may be incident upon fewer than four of the light-sensitive elements in a sampled set, i.e., a color transition occurs within the sampled set, the decoded signal representative of blue light incident on that sampled set will incorrectly indicate that blue light is incident on each light-sensitive element of the sampled set. Moreover, such a decoded signal may also incorrectly indicate where the color transition occurs. The latter problem usually shows up as a trailing blue edge which occurs after the actual color transition and appears to a viewer as a form of misregistration.

The above-described problems are associated primarily with the generation of signals corresponding to the blue components of incident light. The signals representative of red and green light do not share such problems to as great an extent.

Accordingly, it is an object of this invention to provide a method and apparatus for generating an electrical signal representative of the blue component of light incident upon a light-sensitive imaging device which substantially overcomes the above-described problems.

This and other objects of the invention are more particularly set forth in the following detailed description and in the accompanying drawings of which;

FIG. 1 schematically illustrates an imaging system in which the invention may be used;

FIG. 2 schematically illustrates a solid state light pick-up device and addressing and signal processing means for use therewith;

FIG. 3 is a schematic illustration of a fractional row of light sensitive picture elements incorporated in the pick-up device of FIG. 2, an exemplary light input incident upon the illustrated picture elements for use in describing the prior method and the method of this invention, and equations representative of decoding steps according to this invention;

FIG. 4 graphically illustrates the signals developed by the prior method and by the present invention in response to the light input illustrated in FIG. 3;

Figure 7:
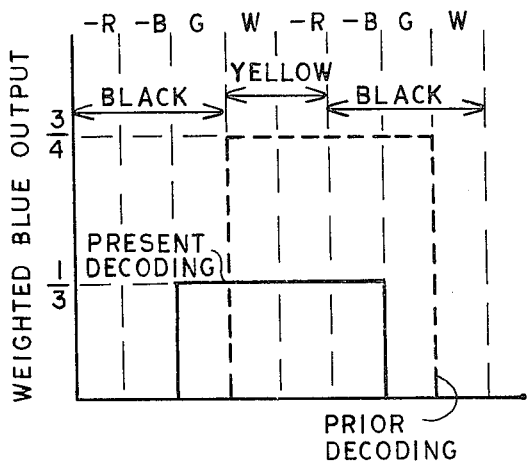
Figure 8:
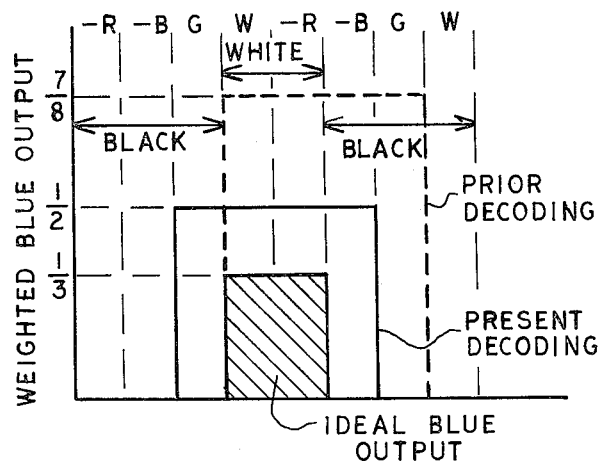
Figure 9:
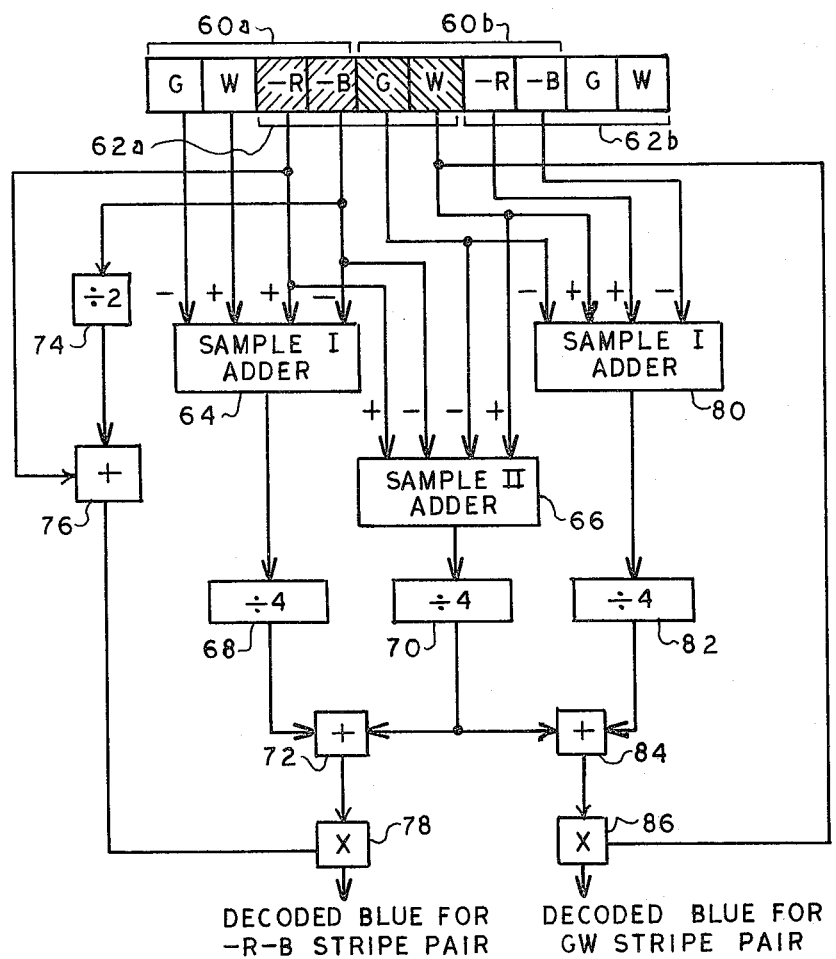

FIGS. 7 and 8 graphically illustrate the signals developed by the prior method and reduced bandwidth signals developed in accordance with the additional aspect of this invention in response to various light inputs incident upon a fractional row of light sensitive picture elements; and FIG. 9 schematically illustrates exemplary circuitry for carrying out the steps of this invention.

DESCRIPTION OF THE PREFERRED EMBODIMENT

Broadly stated, this invention provides an improved method and apparatus for generating an electrical signal representative of the average intensity of the blue component of light which is incident upon an imaging device having repeating, horizontally or vertically spaced sets of light-sensitive picture elements. Each such light-sensitive element in a set may be responsive to light of one or more predetermined wavelengths by virtue of a corresponding set of filter stripes interposed between the light-sensitive elements of a color television camera, for example, and the object being scanned.

In the described method, each set of light-sensitive elements may include four such elements responsive respectively to light corresponding to the G, W, −R, and −B components thereof, for example. To generate a signal proportional to the blue component of light incident upon a selected pair of picture elements of a selected set (the −R and −B responsive elements, for example) the outputs of each of the light-sensitive elements of the selected set are detected. In addition, the outputs of a pair of picture elements, such as the G and W responsive picture elements, of an adjacent set are detected. The detected outputs of all picture elements in the selected set are combined with the detected outputs of the picture elements in the adjacent set such that the outputs of the selected picture elements are included twice in the combined total and such that the output signals of picture elements responsive to incident blue light are added together and the output signals of picture elements responsive only to incident red and green light are subtracted therefrom. The combination is averaged by dividing it by the total number of picture elements in a set. The resultant signal is proportional to the average intensity of the blue component of light incident upon the selected pair of picture elements, for example, the −R and −B responsive elements in the selected set.

In a similar manner to be described, a signal is generated which is proportional to the blue component of light incident upon a selected pair of picture elements in the adjacent set. By detecting and decoding the outputs of pairs of light sensitive picture elements as described herein, signals are generated which are proportional to the average intensity of the blue component of light incident on every pair of picture elements. Such signals may also be multiplied by a weighted luminance factor to make such signals correspond substantially to the average intensity of blue light incident upon the pairs of picture elements.

The resultant signals thus obtained for pairs of picture elements have double the bandwidth of a signal which is representative of the blue component of light averaged over the entire set. In cases where such higher bandwidth signals cannot be used, the resultant double bandwidth signals may be operated on as described herein to obtain a new signal of half the bandwidth, which new signal is representative of the blue component of light averaged over a set of elements.

Figure 1:
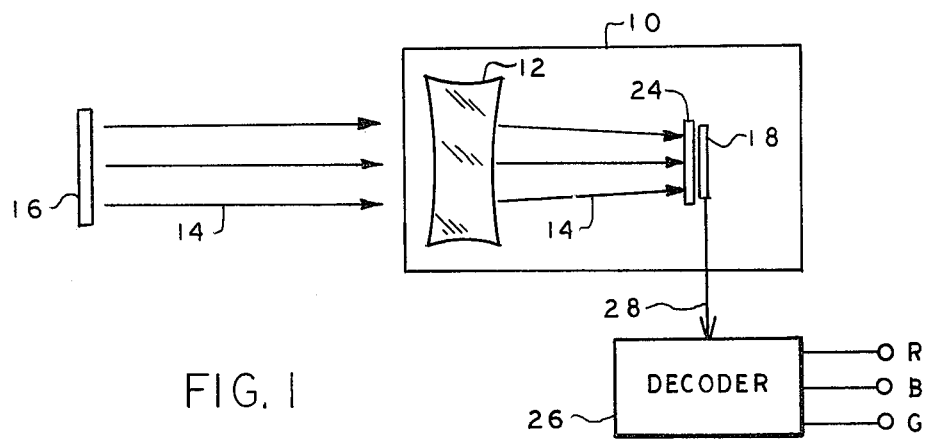
Figure 2:
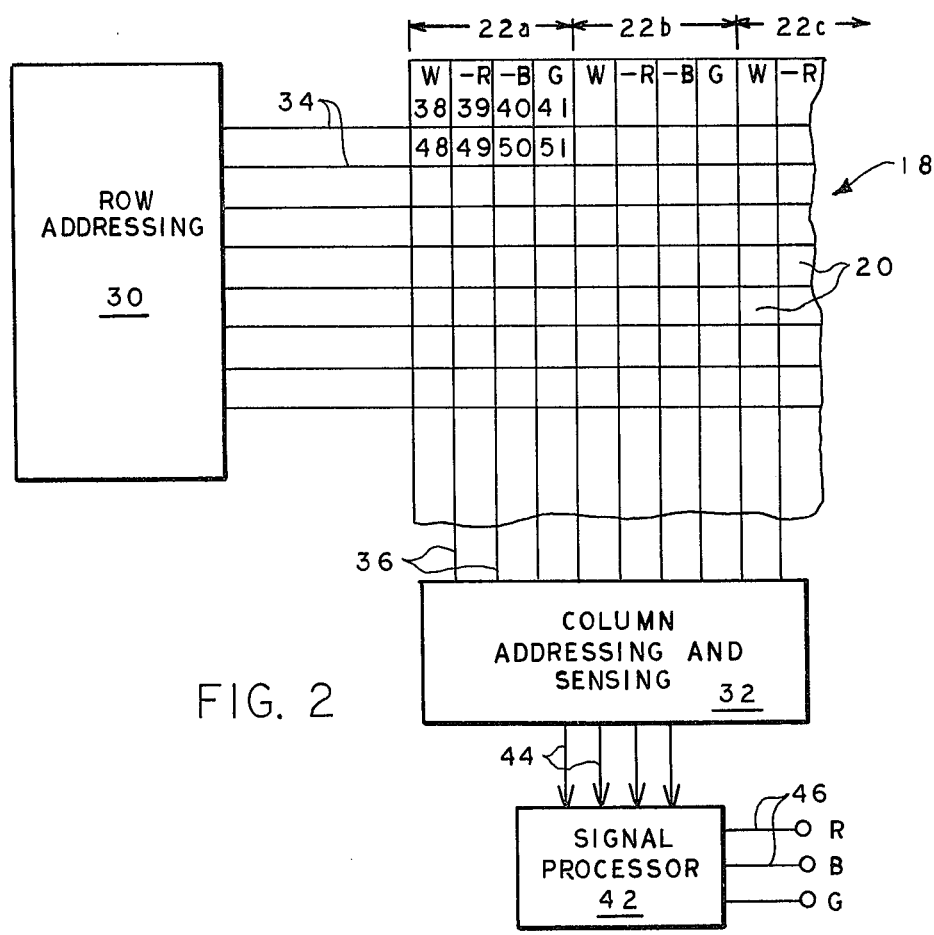

A type of imaging system in which the invention finds use is illustrated schematically in FIG. 1, wherein an imaging device is indicated generally at 10. The imaging device 10 may include a lens system 12 for focusing light rays 14 from an object 16 onto a solid state pick-up device 18. The pick-up device 18 is preferably constructed as shown schematically in FIG. 2 and has vertically extending and horizontally spaced stripes 20 which generate electrical signals proportional to the intensity of incident light thereon. Each stripe 20 bears a notion W, −R, −B or G, to indicate the color of light to which the stripes are to be responsive. As indicated in FIG. 2, the pick-up device 18 includes repeating sets of stripes 22a, 22b, 22c, etc., each such set including the same ordered arrangement of light-sensitive stripes.

In order to make the individual light-sensitive stripes 20 responsive to a particular color or colors, a filter 24 is disposed between the lens system 12 and the pick-up device 18, as shown in FIG. 1. The filter 24 includes vertically extending stripe filters which only pass light of the colors indicated on the stripes 20 of FIG. 2. That is, the filter 24 includes a succession of sets of filter stripes, each set of filter stripes including filters transmissive of the W, −R, −B and G components of incident light.

The light sensitive stripes 20 respond to incident light of the proper wavelength by generating electrical signals which are fed to a decoder 26 via a set of leads shown schematically as lead 28 in FIG. 1. The decoder 26 samples the outputs of the various light sensitive stripes 20 and generates at its output signals representative of the red, blue and green components of incident light. These R, B, G, output signals may then be incorporated into a composite video signal for further transmission in a manner well known in the art.

Referring again to FIG. 2, there is shown very schematically an exemplary addressing and decoding system for use with the pick-up device 18. As shown, there is included a row addressing means 30 and a column addressing and sensing means 32. The row addressing means 30 is connected to the light-sensitive stripes 20 via leads 34 and the column addressing and sensing means 32 is connected to successive light-sensitive stripes 20 by means of leads 36. In operation, the row addressing means 30 first addresses the topmost row of light-sensitive stripes 20 and the column addressing and sensing means 32 addresses the first four leftmost light sensitive stripes 20, indicated herein as set 22a. The intersection of the addressed leads 34 and 36 defines four picture elements 38, 39, 40 and 41, the outputs of all of which are sampled via the leads 36 and sent to a signal processor 42 via leads 44 for generation of the red, blue and green output signals at leads 46. The R, B and G signals present at leads 46 are representative of the average red, blue and green components of the light incident upon picture elements 38, 39, 40 and 41.

The column addressing and sensing means 32 then addresses the next set 22b of light sensitive picture elements in the top row thereof, samples their outputs and sends them to the signal processor 42 for development of corresponding R, B, G signals. This successive sampling of adjacent sets of picture elements continues until each set of elements in the top row has been sampled. The row addressing means 30 then addresses the second row in the pick-up device 18 and the column addressing and sensing means 32 again addresses the set of stripes 22a for sampling picture elements 48, 49, 50 and 51. This continuous scanning of the pick-up device 18 continues until each picture element in the pick-up device has been sampled, one set at a time.

The prior method of sampling and processing the outputs of sets of picture elements is described briefly hereinafter and is thought to provide adequate results as far as the red and green signals are concerned. However, as pointed out above, the prior method provides an inadequate response to incident blue light. The method of this invention generates a signal which more accurately corresponds to the average level of blue light incident upon the light sensitive stripes 20.

Figure 3:
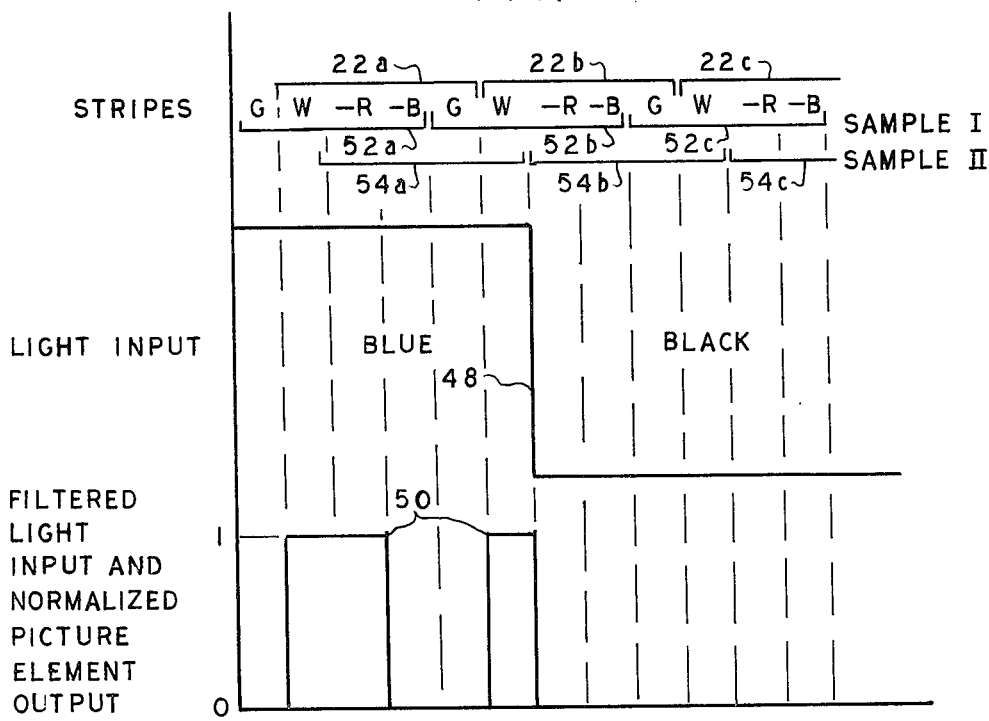

Referring now to FIG. 3, there is shown a representation of both the prior method and the present method of sampling and decoding the outputs of successive sets of picture elements. At the top of FIG. 3 there is shown one row of light-sensitive picture elements, each such element bearing a notation indicative of the color of light to which it is intended to be responsive. According to the prior method of sampling the outputs of the picture elements, the elements are sampled in repeating sets of four elements each, such sets being indicated as 22a, 22b and 22c. The first or "W" picture element of each such set is responsive to white light, the remaining elements of each of the sets 22a, 22b and 22c being responsive to minus red, minus blue and green light, respectively.

To illustrate the prior method, it is assumed that a blue to black transition 48 occurs in the light received by the filter 24 (FIG. 1). The normalized output of the filter which is incident upon the sets 22a, 22b and 22c of the picture elements is indicated by waveform 50. Waveform 50 also illustrates the normalized output signals for each of the individual picture elements. For example, the blue to black transition 48 causes the W and −R picture elements of set 22a to generate a normalized signal output of 1 while the adjacent −B picture element has a signal output of zero.

In the prior method, the picture elements comprising set 22a are first sampled. To generate an output corresponding to the average level of the blue component of light incident on the set 22a of picture elements, their outputs are, in essence, added and divided by two. For example, an output signal of value 1 is sampled for the W and −R picture elements of set 22a, the G and −B picture elements having an output of zero since no light is incident upon them. The total of the picture element outputs sampled in set 22a is 2 and when that total is divided by 2, the result is an averaged output of 1 for the entire set 22a. That is, the output of each element is assumed to be 1 for the set 22a. This result is shown graphically in FIG. 4, wherein the results of the prior method are indicated by the dashed lines. As shown, the prior method generates a constant output signal of 1 for the set 22a of picture elements even though their actual output signals have values shown by waveform 50.

When the prior decoding method samples the next adjacent set 22b of picture elements, the total sampled output is 1 for the set 22b because only the W picture element receives a light input. After dividing the totaled output of the set 22b of picture elements by two, an average output signal value of 0.5 is obtained. As indicated in FIG. 4, the value of 0.5 is constant for the entire set 22b, after which the output declines to zero.

Figure 4:
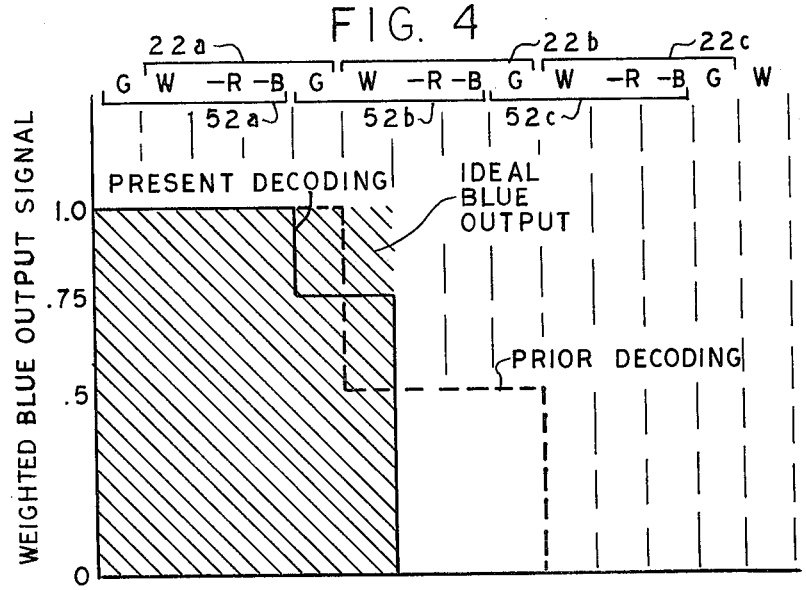

The ideal output of the sets 22a and 22b of picture elements is indicated in FIG. 4 as the cross-hatched area and has a constant value of 1 for the set 22a and for the W picture element of set 22b. Such an output corresponds identically to the blue light input waveform 48 in FIG. 3.

One problem with the prior decoding method is apparent from FIG. 4, namely, although the blue light input waveform 48 extends only up to the −R picture element of set 22b, the output generated by the prior method extends up to the W picture element of set 22c, an excess of three picture elements. This excess output appears as a trailing blue edge on an image reproduced from this signal and is, of course, undesirable.

The above-described problem with the prior method is substantially avoided by the method of the present invention which will now be described with reference to FIG. 3. As indicated near the top of FIG. 3, the sets of picture elements preferably used with picture elements responsive to the green, white, minus red and minus blue components of light are sets 52a, 52b and 52c. Each such set includes four picture elements beginning with a G element and ending with a −B element. To generate a signal representative of the blue component of light incident on a selected pair of picture elements of set 52a, the −R and −B elements for example, the outputs of all picture elements of set 52a are detected as well as the outputs of a pair of picture elements in set 52b, the G and W elements. The detected outputs of all picture elements in set 52a are selectively combined with the detected outputs of set 52b (the G and W elements) such that the outputs of the selected picture elements (the −R and −B elements of set 52a) are included twice in the combined total. Alternately, the outputs of the −R and −B elements of set 52a may be multiplied by two prior to combining them with the other detected outputs. The selective combining is effected by adding together the outputs of elements responsive to incident blue light (the W and −R elements) and subtracting therefrom the outputs of elements responsive only to incident red and green light (the −B and G elements). The combined total is then averaged by dividing it by the number of elements in a set, i.e., dividing by four for the illustrated example. The resultant signal is proportional to the blue component of light incident upon the selected −R−B elements of set 52a.

The procedure described above may be alternately effected by a similar equivalent procedure. For this purpose, second sets of picture elements are indicated as sets 54a, 54b and 54c, and these sets overlap the sets 52 by two picture elements by including the −R and −B elements of one set 52 and the G and W elements of the next adjacent set 52.

The output of each picture element of the set 52a is detected. Thereafter or simultaneously, the output signal of each picture element of set 54a is detected. Thus, the outputs of the selected −R and −B picture elements of set 52a are detected twice. The output signals detected in sets 52a and 54a are then combined such that the output signals of the picture elements responsive to incident blue light are added together and the output signals of picture elements responsive only to red and green light are subtracted therefrom. Specifically, the combined total may be obtained by first selectively combining the outputs of the picture elements sampled in the set 52a by adding together the outputs of the W and −R picture elements and subtracting from that total the outputs of the G and −B picture elements. The sum of those outputs is referred to herein as Sample I. Equation (a) of FIG. 3 describes this step. Note that if R+B+G is substituted for the (W) term in equation (a), the G and R terms cancel out, leaving only the B terms. Thus, this combination results in excluding the outputs of elements responsive only to red and green light. If other color responsive picture elements are used or are ordered differently than shown in FIG. 3, their outputs should be correspondingly combined to exclude the outputs of elements responsive only to red and green light.

In the example shown in FIG. 3 where the blue to black transition 48 occurs and wherein the waveform 50 indicates the normalized light incident upon the sets 52a, 52b and 52c of picture elements, the total arrived at by Sample I for sets 52a is equal to 2, i.e., Sample I equals $-0(G)+1(W)+1(-R)-0(-B)=2$, where the letters G, W, $-R$ and $-B$ identify correspondingly lettered picture elements of set 52a.

Next, the outputs of the picture elements detected in set 54a are selectively combined by adding together the signal outputs of the W and $-R$ picture elements and subtracting therefrom the signal outputs of the $-B$ and G picture elements. The sum of those outputs is referred to herein as Sample II. Equation (b) of FIG. 3 describes this sample. For the instant example, Sample II equals $+1(-R)-0(-B)-0(G)+1(W)=2$. The totals of the Samples I and II are then averaged. Because there are four picture elements in each set, the totals of the Samples I and II are divided by four to obtain their respective averages. For this example the average for Sample I is 9.5 and the average of Sample II is also 0.5.

To obtain a signal which is proportional to the average blue light incident upon the pair of picture elements $-R$ and $-B$ of set 52a, the averages of Samples I and II are added together. In this example, the averages of Sample I and Sample II $= 0.5+0.5=1$. This result, 1, is an output signal which is proportional to the average intensity of the blue component of light incident upon the $-R$ and $-B$ picture elements of set 52a.

Although the output signal derived above is proportional to the average intensity of the blue component of incident light, it is preferable that such output signal correspond directly to the average intensity of the blue component of incident light. To achieve such direct correspondence, the signal ouput derived above, i.e., the average total of Samples I and II, is multiplied by a weighted luminance factor. In general, the luminance factor is chosen to give a signal output whose amplitude corresponds to the intensity of a blue input when the imaged field is either solid blue or solid white, that is, a normalized output amplitude of 1 is desired for a solid blue input and a normalized output amplitude of ⅓ is desired for a solid white input. This assumes that white is composed of ⅓ each of blue, red and green light. Where this assumption is not followed, the weighted luminance factor can be adjusted as required.

In the instant case where a signal output for the $-R$ and $-B$ picture elements is desired, the averaged total of Samples I and II may be multiplied by the factor comprising ½ the normalized output of the $-B$ picture element plus the normalized output of the $-R$ picture element for the set of picture elements being sampled. This step is described by equation (c) of FIG. 3 wherein $-R+-B$ refers to the normalized output of the $-R$ and $-B$ picture elements in the set being sampled. In the illustrated example, the normalized output of the $-R$ picture element is 1 and the normalized output of the $-B$ picture element is zero. Accordingly, the weighted luminance factor equals 1. Therefore, the weighted output for the $-R$ and $-B$ picture elements of set 52a remains 1. Referring to FIG. 4, the weighted blue output signal is shown by the solid line as having a value of 1 for the $-R$ and $-B$ picture elements of set 52a.

To obtain an output signal for the G and W elements of set 52b, the output of each picture element in set 52b is detected. These detected outputs are selectively combined with the previously detected outputs of the $-R$ and $-B$ elements of set 52a such that the outputs of the selected GW pair of elements are included twice in the combined total. As before, the outputs of picture elements responsive to incident blue light are added together and the outputs of picture elements responsive only to incident red and green light are subtracted therefrom. The total thus obtained is divided by four, whereby the resultant signal is proportional to the blue component of light incident on the selected GW pair of elements.

Alternately, the method of using two overlapping sets of picture elements may be applied to the GW pair of picture elements in set 52b. To obtain an output signal for the G and W picture elements of set 52b using overlapping sets, each picture element output in set 52b is detected and combined in accordance with equation (a) of FIG. 3 and then averaged by dividing by 4. In the instant example, the total of Sample I for set 52b $= 0(G)+1(W)+0(R)-0(B)=1$ and the averaged total equals ¼. This averaged total is then summed wth the previous averaged total for Sample II of set 54a which is ½. The averaged totals are then combined to arrive at a signal output for the G and W picture elements of set 54a which is proportional to the intensity of the blue component of light incident on those G and W picture elements, i.e., ¾.

As with the previous $-R$ and $-B$ picture elements of the set 52a, it may be desirable to obtain an output signal for the G and W picture elements which corresponds directly to the average intensity of the blue component of light incident thereon. In the case where the picture elements are responsive to light as indicated in FIG. 3, i.e., W, $-R$, $-B$ and G, such an output signal may be obtained by multiplying the last obtained averaged totals of Samples I and II by the normalized output of the W picture element of set 52b, i.e., 1 in the illustrated example. Equation (d) of FIG. 3 indicates this procedure. Accordingly, the weighted output signal for the G and W picture elements of set 52b is ¾ and this value is shown by the solid line of FIG. 4.

A comparison of the output signals of FIG. 4 shows that the present method provides a much more accurate method of decoding the outputs of the picture elements. As shown, no trailing blue edge is obtained and the weighted output signal for the sets 52a and 52b corresponds substantially to the ideal output for those sets of picture elements.

In order to obtain the output values for the $-R$ and $-B$ picture elements of set 52b, the same procedure is followed as was used for the $-R$ and $-B$ picture elements of set 52a. For example, a Sample I of the outputs of set 52b is taken and totaled in accordance with equation (a) of FIG. 3. This total is then divided by 4. (Note that this averaged total was previously obtained for use in determining the outputs of the preceding G and W picture elements.) Next, a Sample II of the outputs of the picture elements of set 54b is obtained, totaled in accordance with equation (b) of FIG. 3, and the result is divided by 4. The two averaged totals are then added to arrive at a signal output for the $-R$ and $-B$ picture elements of set 52b. This result may be multiplied by the appropriate luminance weighting factor, i.e., ½ the output of the $-B$ picture element plus the output of the $-R$ picture element in the sampled set. This procedure for each GW and $-R-B$ pair of picture elements is set forth compactly in equations (c) and (d) of FIG. 3.

Stating the procedure for using overlapping sets generally, overlapping Type I and Type II samples are chosen as indicated in FIG. 3. To obtain a signal output level for any −R and −B pair of picture elements, a Sample I of the set within which the elements are included, e.g., set 52a, is taken in accordance with equation (a) of FIG. 3 and the total is divided by 4. Then a Sample II is taken of the overlapping set, e.g., set 54a, and the total is taken in accordance with equation (b) of FIG. 3 and divided by 4. The two averaged totals are then added together and multiplied by the weighting factor for a −R and −B pair as indicated in equation (c), i.e., $-R+\frac{1}{2}(-B)$, where −R and −B indicate the normalized outputs of the individual −R and −B picture elements of the set being sampled.

For any G and W pair of picture elements, a Sample I of all the elements in the set including the G and W pair of interest is taken and a Sample II of all the elements of an overlapping set is taken. Both samples are then totaled, divided by 4, and added together. The result is then multiplied by the weighting factor for GW pairs, that is, the normalized output of the individual W picture element in the sampled set.

To obtain signal outputs for each successive pair of −R−B and GW picture elements, the process is repeated for the entire row and each subsequent row of picture elements. Applying this method to all picture elements to the right of the W picture element of set 52b in FIG. 4 gives an output of zero.

Although equations (c) and (d) indicate that averaging, i.e., dividing by four, is applied to Samples I and II prior to combining them, the average may also be taken after combining them.

Figure 5:
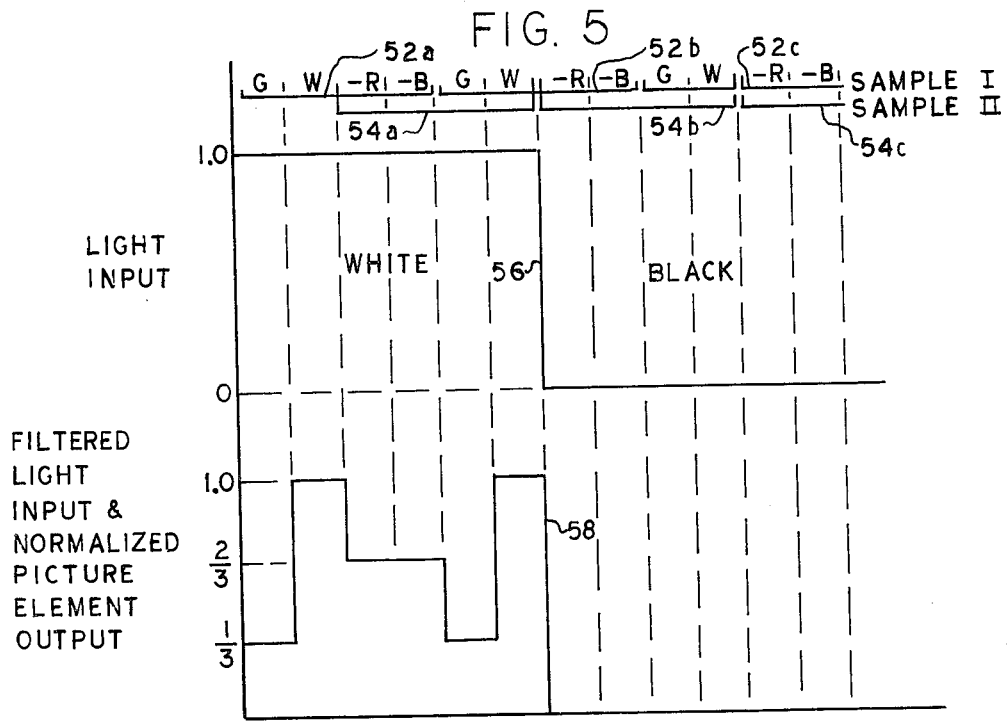
FIG. 5 is a schematic representation of a fractional row of light-sensitive picture elements and a light input incident upon those picture elements.

To further illustrate the application and advantages of this method, reference is made to FIG. 5 wherein a row of picture elements is again grouped into sets 52a, 52b and 52c, and the overlapping sets are 54a, 54b and 54c. For the illustrated light input, a white to black transition identified by waveform 56, the filtered light input to and the normalized picture element output from the picture elements is indicated by waveform 58. Applying equations (a)–(d) of FIG. 3 to this example, one obtains a weighted blue output of $\frac{1}{2}$ for the −R−B pair of picture elements in set 52a and $\frac{1}{2}$ for the GW pair of picture elements in set 52b. The weighted blue output for succeeding picture elements is zero. These results are shown graphically in FIG. 6 where the solid line indicates the results of the present method, the crosshatched portions indicates the ideal output, and the dashed line indicates the output obtained by the prior decoding method.

Once again, the present method is shown as providing results superior to the prior method. The prior method provides a trailing blue edge three picture elements wide and has an incorrect amplitude for the output of the W picture element of set 52b.

Figure 6:
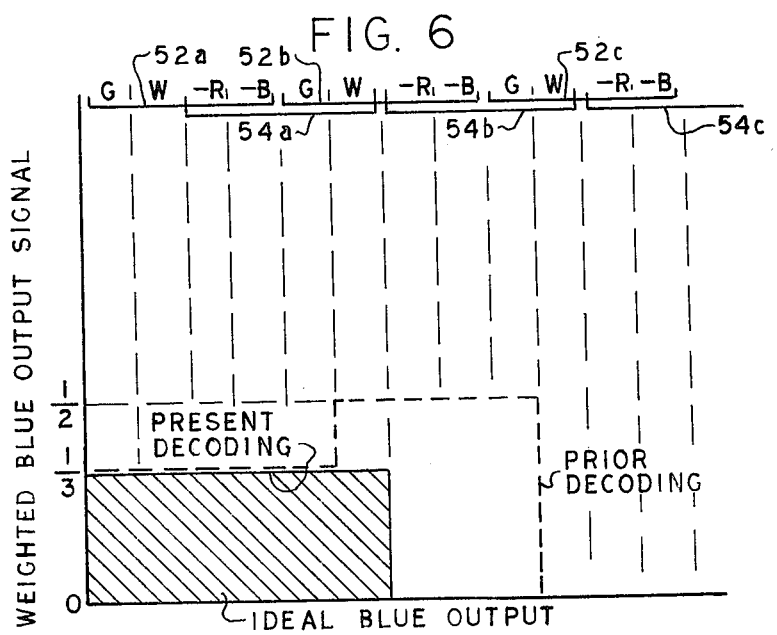
FIG. 6 is a graphic representation of the signal developed by the prior method and by the method of the present invention in response to the light input illustrated in FIG. 5.

The results indicated in FIGS. 4 and 6 show the superior results obtained with the present method of decoding. However, the two signals obtained, corresponding to the average intensity of the blue component of light incident on individual GW and −R−B pairs of picture elements, occupy a bandwidth which is twice as wide as that ordinarily used for such signals in commercial television formats. They are however, entirely suitable for use in other systems such as closed circuit television systems wherein commercial television formats are not necessarily followed.

In order to use the signals developed according to this method in a commercial television format, their bandwidths should be decreased by one half. Toward this end, the signals developed for those pairs of picture elements which are commonly sampled in Sample I and Sample II type sets (as shown in FIGS. 3 and 5 for example) are combined to form a single signal of one half the bandwidth of the two individual signals. For example, the signals derived in accordance with equations (c) and (d) of FIG. 3 are added together and divided by two. The result is a reduced bandwidth signal corresponding to the average intensity of the blue component of light incident on the set of picture elements comprising adjacent GW and −R−B pairs of picture elements.

Referring to FIG. 3, the above-described reduced bandwidth signal may be generated for the set of picture elements 52b by taking a Sample I as in equation (a) of the picture elements in set 52b and a Sample II as in equation (b) of the picture elements in set 54a, and applying equation (d) to arrive at a double bandwidth signal for the GW pair of picture elements in set 52b. Further, a Sample II according to equation (b) of FIG. 3 is taken of the picture elements in set 54b. Equation (c) of FIG. 3 is then applied to the samples taken of sets 52b and 54b to arrive at a double bandwidth signal for the −R−B picture elements of set 52b. The two double bandwidth signals are then added together and averaged (as by dividing by two) to obtain a reduced bandwidth signal corresponding to the average intensity of the blue component of light incident on the entire set 52b of picture elements. The steps recited above may be repeated for each successive set of picture elements.

Although the reduced bandwidth signal does not always have all the information contained in the two double bandwidth signals, it still produces results which are generally superior to prior decoding methods. For example, FIG. 7 illustrates the results obtained when a black to yellow transition and a yellow to black transition occur and the signal derived by this method is reduced in bandwidth as described above. In this instance, there should ideally be no blue output from any of the sampled picture elements. While the present method does provide an unwanted blue output, its amplitude is less than that of the prior decoding method. Further, the blue output obtained by the present method is centered about the color transitions and therefore appears less objectionable than the output obtained by the prior method which is offset to the right by one picture element.

Referring now to FIG. 8, there is shown a graphical illustration of the results obtained by the present method and the prior method when a black to white transition and a white to black transition occur within a set of picture elements and the signal derived is again reduced in bandwidth as described above. The crosshatched area indicates that the ideal normalized output would be of a value of $\frac{1}{2}$ for the middle W and −R picture elements and zero elsewhere. The results obtained by the present method provide a wider and larger amplitude output than is ideal, but, once again, these results are superior to those obtained by the prior method whose output is larger in amplitude and offset to the right by one picture element.

The examples discussed above generally indicate worst case conditions and, in each instance, the results obtained by the present method have been shown to be superior to the results obtained by the prior method. Although the difference in the results may not be as great for other types of color transitions and although the prior method sometimes provides a more accurate output, on the whole, the present method provides superior results. The ability of the present method to more accurately position the color transitions is made possible by the overlapping sampling of the present method so that more information is obtained concerning the position and amplitude of a color transition.

Structure for carrying out the present invention may take a variety of forms and include elements which are well known in the art. An exemplary schematic arrangement of such well known components in the form of a signal processor for generating the double bandwidth signals by using overlapping sets is shown in FIG. 9. As shown, a partial row of picture elements includes sets 60a and 60b and overlapping sets 62a and 62b. The illustrated signal processor is connected so as to develop weighted blue output signals for the −R−B and GW pairs of picture elements which are cross-hatched. It is understood that the structure may be applied to successive sets of picture elements for scanning and sampling an entire row or rows of such sets. As indicated, an adder 64 is connected to each picture element of set 60a and an adder 66 is connected to each picture element of set 62a for sampling the outputs of the individual picture elements. Adders 64 and 66 are indicated as being a Sample I adder and a Sample II adder, respectively, to indicate the correspondence between the illustrated structure and equations (a) and (b) of FIG. 3. The plus and minus signs adjacent the inputs to the adders 64 and 66 indicate that the corresponding input is to be added or subtracted from the total.

The outputs of adders 64 and 66 are coupled to divide-by-four dividers 68 and 70, respectively, which average their respective inputs. The outputs of the dividers 68 and 70 are coupled to an adder 72 which adds its inputs to generate an output signal proportional to the average blue component of light incident upon the cross hatched −R−B pair of picture elements. The luminance weighting factor is derived by coupling the output of the cross-hatched −B picture element to a divide-by-two divider 74 whose output is coupled to an adder 76 along with the output of the cross-hatched −R picture element. The output of the adder 76 and the output of the adder 72 are coupled to a multiplier 78 which multiplies its inputs and develops an output corresponding to the average blue component of light incident upon the cross-hatched −R−B pair of picture elements.

Another adder 80 samples and totals the outputs of the picture elements in set 60b. Of course, the function of adder 80 could be provided by adder 64 merely by switching the inputs of adder 64 to the picture elements of set 60b. Separate adders are illustrated merely for ease of illustration and description.

The output of the adder 80 is coupled to a divide-by-four divider 82 which averages its input. The outputs of dividers 82 and 70 are coupled to another adder 84 whose output is proportional to the average blue component of light incident upon the cross-hatched GW pair of picture elements.

The output of the adder 84 and the output of the cross-hatched W picture element are coupled to a multiplier 86 to develop a weighted output signal corresponding to the blue component of light incident upon the cross-hatched GW pair of picture elements.

To sample an entire row of picture elements, the adders 64 and 66 and their associated adders and multipliers need merely be switched to successive sets of picture elements. Such switching is well known in the art, as are the structural elements of FIG. 9. Accordingly, no further description thereof is necessary.

Although the example discussed herein were for imaging systems using repeating sets of −R, −B, and G and W picture elements, the invention is not so limited. The overlapping sampling of picture elements responsive to other colors will also provide results superior to the prior method.

While this invention has been described in terms of specific steps and structure and with reference to a particular imaging system, it will be obvious to one skilled in the art in light of this disclosure that the method may be altered or modified and adapted to other imaging systems without departing from the spirit and scope of the invention. Accordingly, it is intended to embrace all such modifications and variations which fall within the spirit and scope of this invention as defined by the appended claims.

What is claimed is:

1. In an imaging device having rows of horizontally spaced sets of light-sensitive picture elements, each such element in a set of picture elements generating an electrical output signal in response to one or more of the red, blue and green components of incident light, a method of generating an electrical signal representative of the blue component of light incident upon selected pairs of picture elements of a selected set, comprising:
 a. detecting the outputs of the selected pairs of picture elements and the outputs of all other picture elements in the selected set and the outputs of a pair of picture elements in an adjacent set; and
 b. combining the detected outputs of all picture elements in said selected set with the detected outputs of the pair of picture elements in the adjacent set such that the outputs of the selected picture elements are included twice in the combined total and such that the output signals of picture elements responsive to incident blue light are added together and the outputs of picture elements responsive only to incident red and green light are subtracted therefrom;
 whereby a resultant signal is obtained which is proportional to the blue component of light incident upon the selected pair of picture elements.

2. A method as set forth in claim 1 including the step of multiplying the resultant signal obtained in step (c) by a weighted luminance factor corresponding to the level of luminance incident upon the selected pairs of picture elements, whereby a signal is obtained corresponding essentially to the blue component of light incident upon said selected pairs of picture elements.

3. A method as set forth in claim 1 wherein each set of picture elements consists of four horizontally spaced picture elements and wherein the selected pair of picture elements are the third and fourth picture elements of the selected set and the pair of picture element outputs detected in said adjacent set are the first and second picture elements thereof, whereby the resultant signal obtained in step (c) is proportional to the blue component of light incident upon the third and fourth picture elements of the selected set.

4. A method as set forth in claim 3 wherein the four picture elements in each set are each responsive to light of a different one of the colors corresponding to green, white, minus red and minus blue.

5. In an imaging device having rows of horizontally spaced sets of four horizontally spaced light-sensitive picture elements, each such element in a set generatng an electrical output signal in response to one or more of the red, blue and green components of incident light, a method of generating an electrical signal representative of the blue component of light incident upon selected pairs of picture elements, comprising:

a. detecting the outputs of a first selected pair of picture elements and the outputs of the other picture elements in a selected set and the outputs of a second selected pair of picture elements in an adjacent set;

b. combining the outputs of all picture elements in the selected set with the detected outputs of the second selected pair of picture elements in the adjacent set such that the outputs of the first selected pair of picture elements are included twice in the combined total and such that the outputs of picture elements responsive to incident blue light are added together and the outputs of picture elements responsive only to incident red and green light are subtracted therefrom;

c. dividing the total obtained in step b) by four;

d. detecting the outputs of each picture element in said adjacent set;

e. combining the detected outputs of all picture elements in said adjacent set with the detected outputs of said first selected pair of picture elements such that the outputs of the second selected pair of picture elements are included twice in the combined total and such that the ouputs of picture elements responsive to incident blue light are added together and the outputs of picture elements responsive only to incident red and green light are subtracted therefrom; and f. dividing the total obtained in step (e) by four;

whereby the resultant signal obtained in step (c) is proportional to the blue component of light incident upon the first selected pair of picture elements and the resultant signal obtained in step (f) is proportional to the blue component of light incident upon the second selected pair of picture elements.

6. A method as set forth in claim 5 including the step of averaging the combined totals obtained in steps (c) and (f) to obtain a reduced bandwidth signal representative of the average intensity of the blue component of light incident upon the first and second selected pairs of picture elements.

7. In an imaging device having rows of horizontally spaced sets of four horizontally spaced light-sensitive picture elements, the picture elements in each set being successively ordered so as to generate an electrical output signal in response to incident light corresponding to the colors green, white, minus red and minus blue respectively, a method of generating an electrical signal representative of the blue component of light incident on selected picture elements, comprising:

a. detecting the ouputs of all picture elements in a selected set and the outputs of the green responsive and the white responsive picture elements in an adjacent set;

b. combining the detected outputs of all picture elements in the selected set with the detected outputs of the green responsive and white responsive picture elements in the adjacent set such that the outputs of the minus red responsive and the minus blue responsive picture elements in the selected set are included twice in the combined total and such that the outputs of picture elements responsive to incident blue light are added together and the outputs of picture elements responsive only to incident red and green light are subtracted therefrom;

c. dividing the total obtained in step (b) by four;

d. detecting the outputs of the minus red and minus blue responsive picture elements in said adjacent set;

e. combining the outputs detected in step (d) with the detected outputs of the green responsive and white responsive picture elements in said adjacent set and the detected outputs of the minus red and minus blue responsive picture elements in said selected set such that the outputs of the green responsive and white responsive picture elements in said adjacent set are included twice in the combined total and such that the outputs of picture elements responsive to incident blue light are added together and the outputs of picture elements responsive only to incident red and green light are subtracted therefrom; and f. dividing the total obtained in step (e) by four, whereby the resultant signal obtained in step (c) is proportional to the blue component of light incident upon the minus red and minus blue responsive picture elements of the selected set and the resultant signal obtained in step (f) is proportional to the blue component of light incident upon the green responsive and white responsive picture elements of the adjacent set.

8. A method as set forth in claim 7 including the step of averaging the resultant signals obtained for adjacent green-white and minus red-minus blue pairs of picture elements to thereby obtain a single reduced bandwidth signal representative of the average intensity of the blue component of light incident upon the adjacent green, white, minus red and minus blue picture elements.

9. A method as set forth in claim 8 wherein the averageing effected therein is obtained by adding together the resultant signals obtained for adjacent green-white and minus red-minus blue pairs of picture elements and dividing the result by two.

10. A method as set forth in claim 7 wherein the resultant totals obtained in steps (b) and (e) are obtained by adding together the detected output signals of the white responsive and minus red responsive picture elements and subtracting therefrom the detected output signals of the green responsive and minus blue responsive picture elements.

11. A method as set forth in claim 10 including the step of multiplying the result obtained in step (c) by a factor comprising the sum of the output of the minus red responsive picture element and one half the output of the minus blue responsive picture element in the selected set whereby the resultant signal thus obtained corresponds substantially to the blue component of light incident upon the minus red responsive and minus blue responsive picture elements in the selected set.

12. A method as set forth in claim 10 including the step of multiplying the result obtained in step (f) by the detected output of the white responsive picture element in said adjacent set, whereby the resultant signal thus obtained corresponds substantially to the blue component of light incident upon the green responsive and white responsive picture elements in said adjacent set.

13. For use with an imaging device having rows of horizontally spaced sets of light-sensitive picture elements, each such element in a set of picture elements generating an electrical output signal in response to one or more of the red, blue and green components of incident light, a signal processor for generating an electrical signal representative of the blue component of light incident upon a selected pair of picture elements of a selected set, comprising:

means for combining the outputs of the selected pair of picture elements and the outputs of all other picture elements in the selected set with the outputs of a pair of picture elements in an adjacent set such that the outputs of the selected picture elements are included twice in the combined total and such that the output signals of picture elements responsive to incident blue light are added together and the outputs of picture elements responsive only to incident red and green light are subtracted therefrom;

whereby a resultant signal is obtained which is proportional to the blue component of light incident upon the selected pair of picture elements.

14. A signal processor as set forth in claim 13 including means for multiplying the divided signal by a weighted luminance factor corresponding to the level of luminance incident upon the selected pair of picture elements, whereby a signal is obtained corresponding essentially to the blue component of light incident upon said selected pair of picture elements.

15. For use with an imaging device having rows of horizontally spaced sets of four horizontally spaced light-sensitive picture elements, each such element in a set generating an electrical output signal in response to one or more of the red, blue and green components of incident light, a signal processor for generating an electrical signal representative of the blue component of light incident upon selected pairs of picture elements, comprising:

means for combining the outputs of a first selected pair of picture elements and the outputs of the other picture elements in a selected set with the outputs of a second selected pair of picture elements in an adjacent set such that the outputs of the first selected pair of picture elements are included twice in the combined total and such that the outputs of picture elements responsive to incident blue light are added together and the outputs of picture elements responsive only to incident red and green light are subtracted therefrom;

means for dividing said combined total by four to obtain a first resultant signal;

means for combining the outputs of all picture elements in the adjacent set with the outputs of said first selected pair of picture elements such that the outputs of the second selected pair of picture elements are included twice in the combined total and such that the outputs of picture elements responsive to incident blue light are added together and the outputs of picture elements responsive only to incident red and green light are subtracted therefrom; and means for dividing the combined total of outputs of said adjacent set and of the first selected pair of picture elements by four to obtain a second resultant signal;

whereby the first resultant signal is proportional to the blue component of light incident upon the first selected pair of picture elements and the second resultant signal is proportional to the blue component of light incident upon the second selected pair of picture elements.

16. A signal processor as set forth in claim 15 including means for averaging the first and second resultant signals to obtain a single reduced bandwidth signal representative of the average intensity of the blue component of light incident upon the first and second selected pairs of picture elements.

17. For use with an imaging device having rows of horizontally spaced sets of four horizontally spaced light-sensitive picture elements, the picture elements in each set being successively ordered so as to generate an electrical output signal in response to incident light corresponding to the colors green, white, minus red and minus blue respectively, a signal processor for generating an electrical signal representative of the blue component of light incident on selected picture elements, comprising;

means for adding together the output signals of the white responsive and the minus red responsive picture elements and subtracting therefrom the output signals of the green responsive and minus blue responsive picture elements of a selected set to obtain a first combined signal;

a first divider for dividing the first combined signal by four;

means for adding together the output signals of the minus red responsive picture element in said selected set and the white responsive picture element in an adjacent set and for subtracting therefrom the output signals of minus blue responsive picture element in said selected set and the green responsive picture element in said adjacent set to obtain a second combined signal;

a second divider for dividing the second combined signal by four;

an adder for adding together the divided first and second combined signals to obtain a resultant signal which is proportional to the average intensity of the blue component of light incident upon the minus red and minus blue responsive picture elements of the selected set.

18. A signal processor as set forth in claim 17 including:

a third divider for dividing by two the output of the minus blue responsive picture element of the selected set;

a second adder for adding together the outputs of said third divider and the minus red responsive picture element of the selected set; and a multiplier for multiplying together the output of said second adder and said resultant signal to obtain a signal which corresponds substantially to the average intensity of the blue component of light incident upon the minus red responsive and minus blue responsive picture elements in the selected set.

19. A method as set forth in claim 1 including:
c. averaging the total obtained in step b) by dividing said total by the number of picture elements in a set.

20. A signal processor as set forth in claim 13 further including means for dividing said combined total by the number of picture elements in a set.

* * * * *

UNITED STATES PATENT OFFICE
CERTIFICATE OF CORRECTION

PATENT NO. : 4,087,836
DATED : May 2, 1978
INVENTOR(S) : Douglas Nelson DeFoe

It is certified that error appears in the above-identified patent and that said Letters Patent are hereby corrected as shown below:

Column 12, line 46 (Claim 2, line 1), change "1" to --19--.

Column 12, line 53 (Claim 3, line 1), change "1" to --19--.

Column 15, line 18 (Claim 14, line 1), change "13" to --20--.

Signed and Sealed this

Twelfth Day of June 1979

[SEAL]

Attest:

RUTH C. MASON
Attesting Officer

DONALD W. BANNER
Commissioner of Patents and Trademarks